July 19, 1927.
R. LA FRANCE
1,636,672
MACHINE FOR FORMING GLASS ARTICLES
Filed Nov. 2, 1925
2 Sheets-Sheet 1
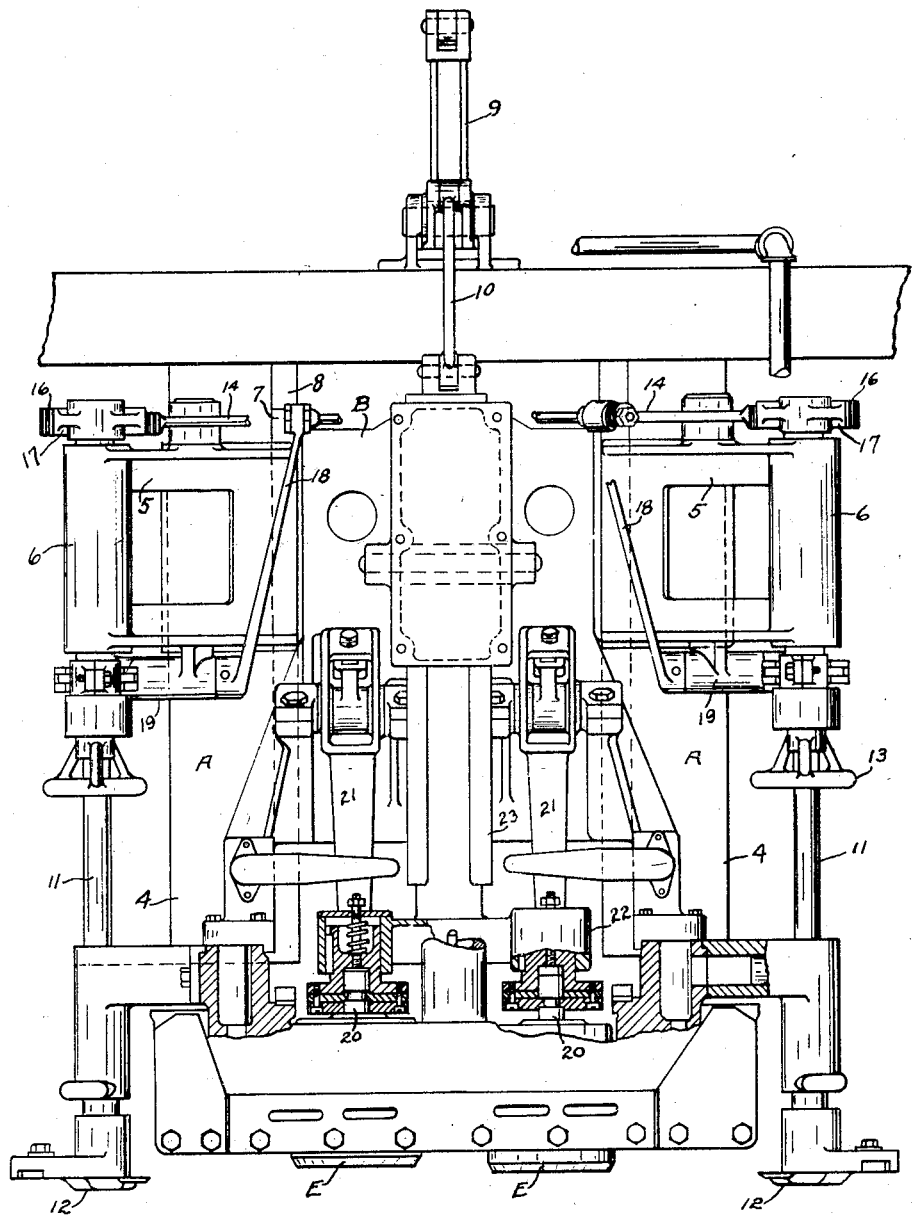
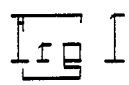
INVENTOR
Richard La France
BY
J. F. Rule.
HIS ATTORNEY July 19, 1927.

R. LA FRANCE 1,636,672

MACHINE FOR FORMING GLASS ARTICLES

Filed Nov. 2, 1925      2 Sheets-Sheet 2

INVENTOR
Richard La France
BY
J. F. Rule
HIS ATTORNEY

Patented July 19, 1927.

1,636,672

UNITED STATES PATENT OFFICE.

RICHARD LA FRANCE, OF TOLEDO, OHIO, ASSIGNOR TO THE OWENS BOTTLE COMPANY, OF TOLEDO, OHIO, A CORPORATION OF OHIO.

MACHINE FOR FORMING GLASS ARTICLES.

Application filed November 2, 1925. Serial No. 66,125.

My invention relates to machines for forming glass articles and more particularly to machines of the Owens type in which blank molds on a continuously rotating frame dip into a gathering tank or pool of molten glass and are filled by suction, the blanks being later transferred to finishing molds in which they are blown to finished form. In this class of machines, a series of heads or units are arranged at equal intervals around the mold group, each unit comprising a blank mold or molds into which the glass is drawn by suction, a cooperating finishing mold or molds disposed therebeneath, and mechanism for effecting suction, blowing and various mechanical operations required in forming the articles.

My invention relates to improvements in machines of the type above indicated, and particularly machines such as described in my co-pending application Serial Number 708,172, filed April 22, 1924, wherein the units of the machine are compounded, each unit having a plurality of molds arranged to travel in the same path through the gathering tank. Heretofore, it has been customary to have the several molds of each unit disposed in the same plane. In practice, it has been found that with this disposition of the molds, the leading blank mold of a unit does not permit the following mold of the same unit to fill as readily or as satisfactorily as the leading mold, owing to the wake or depression set up in the trail of the leading mold through the gathering tank.

This wake is more pronounced in the operation of the machine at high speeds, and its effect on the gathering operation is accentuated by the small distance between the molds in the compounded unit. It will be understood that as the blank molds of the compound unit pass across the forehearth of the furnace and obtain their charges, there is a piling up of glass around the leading mold. Sufficient glass is supplied to the leading mold, but the following mold is not supplied with its requisite and proper amount of glass. This is particularly true when the wake or depression is accentuated, due to high speed in the operation of this type of machine. Further, air obtains easy access into the glass forming the parison, to the obvious detriment of the finished product.

An object of my invention is to obviate the above objection by simple and practical means.

More specifically, the invention comprises a construction in which the following mold of the unit is in a plane lower than the leading mold, thereby assuring that during the passage of the unit across the gathering area, the bottom of the following mold will fully contact with the molten glass.

A further object of my invention is to provide the desired relation of the respective molds in a compound unit, without necessitating extensive alterations to either the machine or molds.

Other objects will appear hereinafter.

In the accompanying drawings:

Figure 1 is an elevation of a single compound unit of the Owens type of bottle forming machine.

Figure 2:
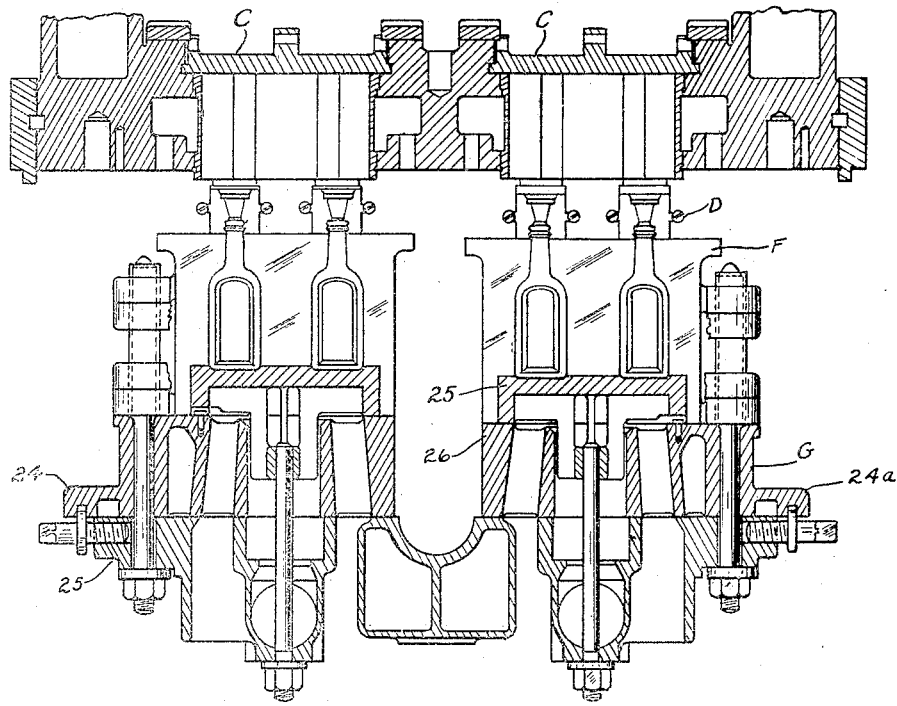
Figure 2 is a sectional elevation of the blowhead, neck and finishing molds, and the castings forming the framework for the finishing molds.
Figure 3:
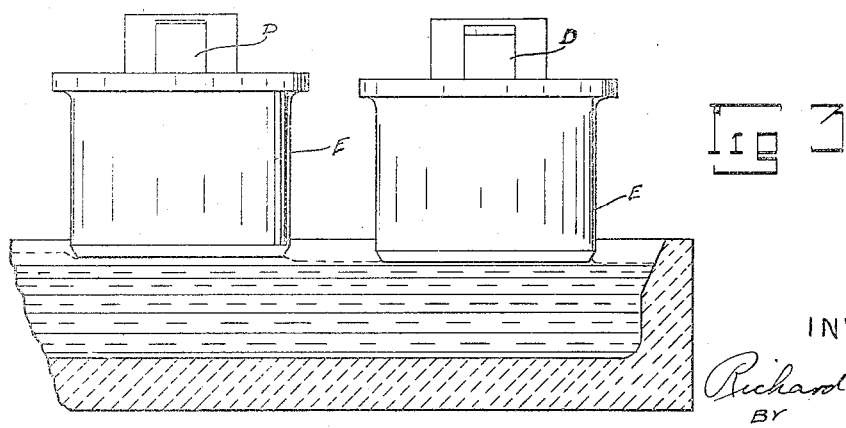
Figure 3 is a section of the forehearth of a furnace, showing the disposition of the molds in a compound unit as the said unit dips into the forehearth of a furnace.

Referring now to the drawings for a detailed description of my invention, there will be seen in Figure 1, a single compound unit of an Owens type of bottle forming machine. Each unit of the machine is supported by a framework A carried on the mold carriage, said framework including outwardly and inwardly inclined members (not shown), vertical portions 4, and forwardly extending members 5.

Mounted to reciprocate vertically in the frame A, is a frame B, including vertical slide bars 7, slidable in guideways 8 in the frame A. Bolted to the lower end of the frame B is a blowing head C (see Fig. 2). Blank suction molds E are also supported by the frame B and are carried up and down therewith. The blank molds E are made in sections mounted on suitable frames having a relative horizontal reciprocation to move the molds out of engagement with the parisons, thereby allowing the latter to be suspended solely by the neck molds.

A suitable weight (not shown) suspended inside of the central pillar about which the unit rotates, acting through the medium of bell crank 9 and connecting link 10, pivoted to the frame B, acts as a counterweight for said frame B. Vertically mounted in bearings 6 provided in brackets 5, forming forward extensions of frame A, are shafts 11 carrying at their lower ends, knife elements 12 cooperating with the blank molds E. Adjustable means 13 provides for regulation of the shearing action. The knife element 12 is reciprocated in a horizontal plane by suitable cam means (not shown) disposed around the axis or central pillar of the machine, links 14 actuated thereby and engaging one end of a bell crank having formed at its other end a segmental rack 16 which meshes with a segmental gear 17 mounted on said shaft 11.

Referring to Figure 1, it will be understood that one of the two blank molds of the compound unit therein illustrated, is disposed at a lower level than the other. This is effected by adjustment of vertical supporting screws, securing the blank molds to radially slidable frames fully described in my co-pending application, Serial Number 708,172, hereinbefore mentioned. The lowering of the following mold in a compound unit as above described, leaves a gap between the standard neck mold and the lowered blank mold, corresponding to the amount said blank mold has been lowered. I contemplate the provision of a specially constructed neck mold which accommodates itself to the change made.

The following finishing mold F (see Fig. 2) is not enlarged at all. Standard size molds may be appropriately used. A finishing mold frame G is mounted to swing on the mold carriage, and consists of castings 24, 24ª, and 25 (see Fig. 2). Supporting plates 25 for the finishing molds rest upon the upper flat surfaces of castings 24 and 24ª. It will be noted that the casting 24ª forming a support for the following mold is turned down at 26 in an amount to correspond with the lowering of the blank molds hereinbefore described, to present a supporting surface for the said mold. By such an arrangement, it is apparent that the following finishing mold of a unit is disposed on the finishing mold frame in correlation with the neck and blank molds. It will thus be understood that I have effected a lowering of one mold of a compound unit by simple means, obviating the necessity of departing from standard blank and finishing molds. Obviously, the only changes needed for my invention to operate are (1) the provision of longer shanks carrying the plunger tips and (2) the slight alteration of the standard neck mold. Such changes are trivial and inexpensive.

Modifications of the above may be resorted to within the spirit and scope of my invention.

What I claim is:

1. In a machine for forming glass articles, the combination of a rotating mold carriage comprising a plurality of units, and compound suction gathering molds in each unit disposed in different planes, substantially as described.

2. In a machine for forming glass articles, the combination of a rotating mold carriage comprising a plurality of units, a plurality of suction gathering molds in each unit comprising a leading suction mold and a following suction mold, the latter being in a lower plane than the leading mold to produce an effectual contact with the supply body of glass as the molds pass thereacross.

3. In a machine for forming glass articles, the combination of a rotating mold carriage comprising a plurality of units, a plurality of suction gathering molds in each unit comprising a leading suction mold and a following suction mold, said molds arranged to travel over a supply body of molten glass, dip into the glass and gather by suction, the gathering end of the following mold being lower than that of the leading mold to offset the depression in the surface of the glass caused by the leading mold.

4. In a machine for forming glass articles, the combination of a rotating mold carriage comprising a plurality of units, blank molds in each unit having the following mold adjusted lower than the leading mold, and a pair of heads supporting plunger tips disposed over and adapted to enter said mold and form initial blow openings in the glass in said blanks.

5. In a machine for forming glass articles, the combination of a rotating mold carriage comprising a plurality of units, blank molds in each unit having the following mold adjusted lower than the leading mold, a pair of heads, plunger tips supported by the latter and disposed over and adapted to enter said molds and form initial blow openings in the glass in said blanks, and means to dispose the plunger tips registering over the following blank molds in a plane corresponding to the disposition of the said following mold, comprising elongated tip-carrying shanks mounted in the respective head of the following mold.

6. In a machine for forming glass articles, the combination of a rotating mold carriage comprising a plurality of units, compound suction gathering molds on each unit disposed in different planes, a pair of heads, plunger tips mounted therein adapted to enter said molds and form initial blow openings in the glass blanks in said molds, and a plurality of compound neck molds in each unit including one set of neck molds and another set of neck molds formed with a lengthened body portion, said last mentioned set of molds lengthened to the amount of change of level of the said following mold.

7. In a machine for forming glass articles, the combination of a rotating mold carriage comprising a plurality of units, compound suction gathering molds on each unit disposed in different planes, a pair of heads, plunger tips mounted therein adapted to enter said molds and form initial blow openings in the glass blanks in said molds, a plurality of compound neck molds in each unit including one set of neck molds, another set of neck molds having an elongated body portion for filling the gap left by the lowered suction blank mold, finishing molds, and compound finishing mold frames arranged to support said finishing molds thereon at different levels, said finishing molds disposed in correlation with their respective neck and blank molds.

Signed at Toledo, in the county of Lucas and State of Ohio, this 30th day of October, 1925.

RICHARD LA FRANCE.